US009974127B2

(12) United States Patent
Ido

(10) Patent No.: US 9,974,127 B2
(45) Date of Patent: May 15, 2018

(54) LIGHTING DEVICE AND LUMINAIRE

(71) Applicant: Panasonic Intellectual Property Management Co., Ltd., Osaka (JP)

(72) Inventor: Shigeru Ido, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/426,127

(22) Filed: Feb. 7, 2017

(65) Prior Publication Data

US 2017/0231040 A1    Aug. 10, 2017

(30) Foreign Application Priority Data

Feb. 9, 2016 (JP) .................................. 2016-022961

(51) Int. Cl.
    *H05B 37/00* (2006.01)
    *H05B 33/08* (2006.01)
    *H02M 7/06* (2006.01)

(52) U.S. Cl.
    CPC .......... *H05B 33/0815* (2013.01); *H02M 7/06* (2013.01); *H05B 33/0887* (2013.01)

(58) Field of Classification Search
    CPC ............ H05B 33/0809; H05B 33/0815; H05B 33/083; H05B 33/0842; H05B 33/0845; H05B 33/0887
    USPC ...................................................... 315/185 R
    See application file for complete search history.

(56) References Cited

U.S. PATENT DOCUMENTS

| | | | | |
|---|---|---|---|---|
| 9,572,210 | B2* | 2/2017 | Kim | H05B 33/083 |
| 9,713,213 | B2* | 7/2017 | Jung | H05B 33/083 |
| 9,730,287 | B2* | 8/2017 | Kim | H05B 33/083 |
| 2013/0026931 | A1* | 1/2013 | Jong | H05B 33/0818 315/186 |
| 2013/0200802 | A1* | 8/2013 | Sakuragi | H05B 33/083 315/122 |
| 2015/0334792 | A1* | 11/2015 | Jung | H05B 33/083 315/186 |
| 2016/0174314 | A1* | 6/2016 | Moon | H05B 33/0824 315/201 |
| 2017/0181232 | A1* | 6/2017 | Howe | H05B 33/0809 |
| 2017/0290113 | A1* | 10/2017 | Lissoni | H05B 33/0815 |

FOREIGN PATENT DOCUMENTS

JP    2006-147933 A    6/2006

* cited by examiner

*Primary Examiner* — Tung X Le
(74) *Attorney, Agent, or Firm* — Renner, Otto, Boisselle & Sklar, LLP

(57) ABSTRACT

A lighting device includes a rectifier circuit, a drive circuit and a current control circuit. Rectifier circuit rectifies an AC voltage into a pulsating voltage to be output. A load circuit including two or more solid light sources connected in series is connected between output terminals of rectifier circuit. The drive circuit changes a number of solid light sources emitting light, according to a change in a voltage value of the pulsating voltage, so that a period of the pulsating voltage includes: a first time period during which a part of the two or more solid light sources emits light; and a second time period during which all of the two or more solid light sources emit light. The current control circuit controls, in at least the second time period, a value of current flowing through load circuit according to an average voltage of the pulsating voltage.

20 Claims, 9 Drawing Sheets

LIGHTING DEVICE AND LUMINAIRE

CROSS-REFERENCE TO RELATED APPLICATION

This application is based upon and claims the benefit of priority of Japanese Patent Application No. 2016-022961, filed on Feb. 9, 2016, the entire content of which is incorporated herein by reference.

TECHNICAL FIELD

This disclosure relates to a lighting device and a luminaire.

BACKGROUND ART

Conventionally, there has been a light-emitting diode lighting device that is configured to cause light-emitting diodes connected in series to emit light (refer to Patent literature 1: JP 2006-147933 A). This light-emitting diode lighting device includes a rectifier circuit and a lighting control circuit. The rectifier circuit rectifies an AC voltage into a pulsating voltage, and then supplies the pulsating voltage to a series circuit of the light-emitting diodes. Within a phase range where the pulsating voltage changes from a low value to a high value, the lighting control circuit performs lighting control for the light-emitting diodes so that the number of light-emitting diodes emitting light is increased according to the change in the pulsating voltage. Within a phase range where the pulsating voltage changes from the high value to the low value, the lighting control circuit performs the lighting control for the light-emitting diodes so that the number of light-emitting diodes emitting light is decreased according to a change in the pulsating voltage.

In the light-emitting diode lighting device described above, there is a possibility that a ripple occurs in output light, when the lighting control circuit increases or decreases the number of light-emitting diodes emitting light.

SUMMARY

The present disclosure is directed to a lighting device and a luminaire, which can reduce a ripple that occurs in output light.

A lighting device according to an aspect of the present disclosure includes a rectifier circuit, a drive circuit and a current control circuit. The rectifier circuit has a pair of output terminals that are to be connected to a load circuit including two or more solid light sources. The two or more solid light sources are connected in series. The rectifier circuit is configured to rectify an AC voltage so as to generate a pulsating voltage between the output terminals. The drive circuit is configured to change a number of the two or more solid light sources which emit light, according to a change in a voltage value of the pulsating voltage, so that a period of the pulsating voltage includes a first time period and a second time period. The first time period is a time period during which a part of the two or more solid light sources emits light and other of the two or more solid light sources do not emit light. The second time period is a time period during which all of the two or more solid light sources emit light. The current control circuit is configured to control, in at least the second time period, a value of current flowing through the load circuit according to an average voltage of the pulsating voltage.

A luminaire according to an aspect of the present disclosure includes the lighting device and a main body for holding the lighting device.

BRIEF DESCRIPTION OF THE DRAWINGS

The figures depict one or more implementations in accordance with the present disclosure, by way of example only, not by way of limitations. In the figures, like reference numerals refer to the same or similar elements.

DETAILED DESCRIPTION

The following embodiments generally relate to lighting devices and luminaires and, more particularly, to a lighting device for lighting a solid light source and a luminaire including the same.

Hereinafter, a lighting device 1 of an embodiment will be described in detail with reference to FIGS. 1 to 8. However, the configuration mentioned below is merely one example of the present disclosure. The present disclosure is not limited to the following embodiments. Numerous modifications and variations can be made according to designs and the like without departing from the technical ideas according to the present disclosure.

First Embodiment (1) Outline

Figure 1:
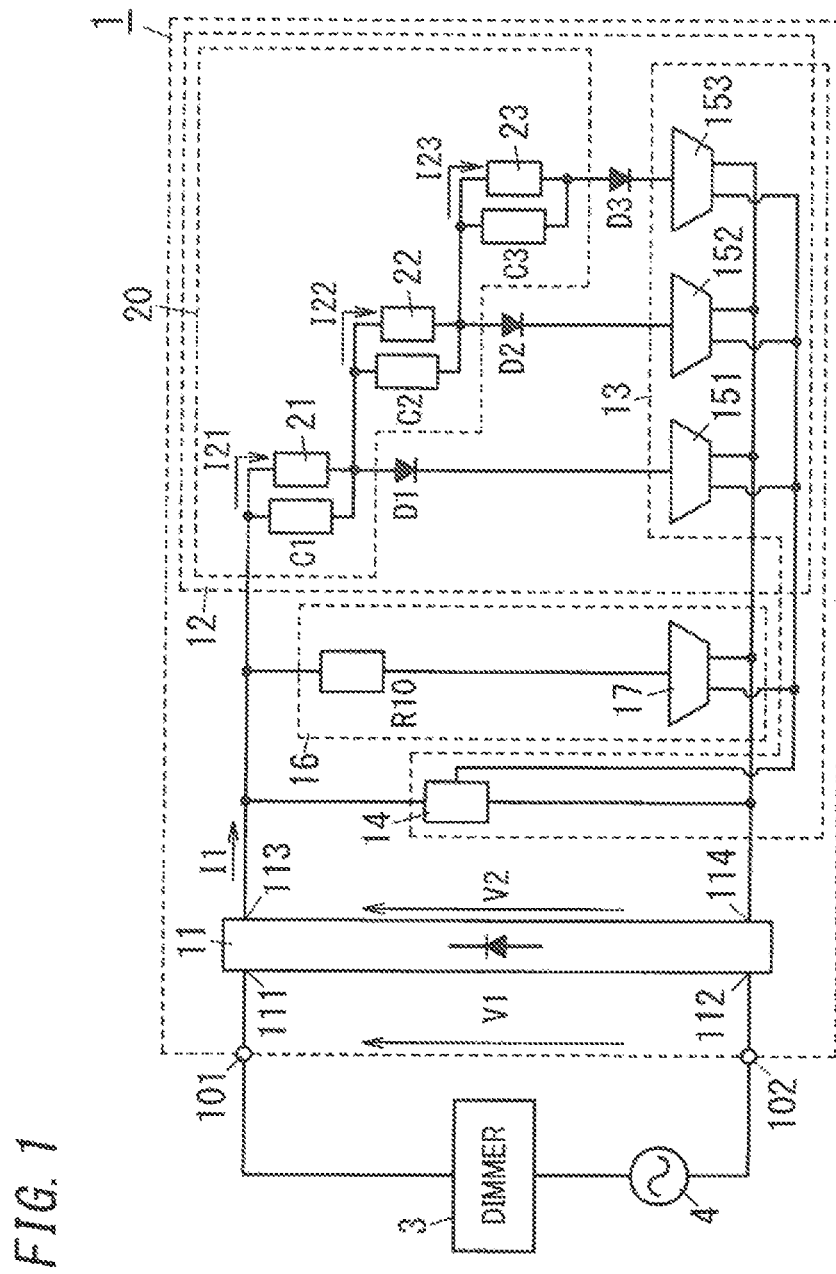
FIG. 1 is a block diagram illustrating a lighting device of a First Embodiment.

As shown in FIG. 1, a lighting device 1 of the present embodiment includes a rectifier circuit 11, a drive circuit 12 and a current control circuit 13. The rectifier circuit 11 has a pair of output terminals 113 and 114 that are to be connected to a load circuit 20. The rectifier circuit 11 is configured to rectify an AC voltage V1 so as to generate a pulsating voltage V2 between the paired output terminals 113 and 114. The load circuit 20 includes two or more solid light sources 2 that are connected in series (refer to FIG. 2). The drive circuit 12 is configured to change the number of the two or more solid light sources 2 which emit light, according to a change in a voltage value of the pulsating voltage V2, so that a period of the pulsating voltage V2 includes a first time period and a second time period. The first time period is a time period during which a part (a subset) of the two or more solid light sources 2 emits light and other of the two or more solid light sources 2 do not emit light. The second time period is a time period during which all of the two or more solid light sources 2 emit light. The current control circuit 13 is configured to control, in at least the second time period, the value of the current (hereinafter, referred to as "load current") flowing through the load circuit 20 according to an average voltage of the pulsating voltage V2.

An "output terminal" mentioned herein may be a component (a terminal) for connecting an electric wire or the like, but may be, for example, a lead of an electronic component, or part of an electric conductor formed as wiring on a circuit substrate. "Connecting" mentioned herein means a state of being electrically conducted. That is, the "connecting" means not only directly connecting but also a state of connecting indirectly with a conductor such as an electric wire.

Since the drive circuit 12 changes the number of solid light sources 2 emitting light according to the change in the voltage value of the pulsating voltage V2, there is a possibility that a ripple occurs in output light of the load circuit 20, when the number is changed. However, in the lighting device 1 of the present embodiment, since the current control circuit 13 is configured to control, in at least the second time period, the value of the load current (input current I1) according to the average voltage of the pulsating voltage V2, it is possible to reduce the ripple in the output light.

Incidentally, in the event a phase-controlled AC voltage is input to the rectifier circuit 11 in order to dim the solid light sources 2, as a dimming level is more reduced, a conduction angle (an ON-period) of the AC voltage V1 is more shortened, and the AC voltage V1 is therefore intermittently input to the rectifier circuit 11. For example, when the dimming level for the solid light sources 2 is at 50%, the conduction angle of the AC voltage V1 falls into 90°, and all of the solid light sources 2 are switched from a non-lighting state to a lighting state at a timing when amplitude of the pulsating voltage V2 is at maximum, and accordingly, there is the possibility that ripple occurs in the output light. Here the second time period is a time period during which all of the solid light sources 2 emit light, and a voltage value in the second time period is higher than voltage values in other time periods within a period of the pulsating voltage V2. Since the current control circuit 13 controls, in at least the second time period, the value of the load current (input current I1) according to the average voltage of the pulsating voltage V2, the value of the load current (input current I1) when the conduction angle of the AC voltage V1 is at 90° is more reduced, compared with the value when the conduction angle is at 180°. As a result, the lighting device 1 of the present embodiment can reduce the ripple that occurs in the output light, even when the solid light sources 2 are dimmed.

(2) Details (2.1) Circuit Configuration

FIG. 1 is a block diagram illustrating the lighting device 1 of the present embodiment. The lighting device 1 includes a rectifier circuit 11, a drive circuit 12 and a current control circuit 13. The lighting device 1 further includes input terminals 101 and 102, and a shunt circuit 16 referred to as a bleeder circuit.

Figure 2:
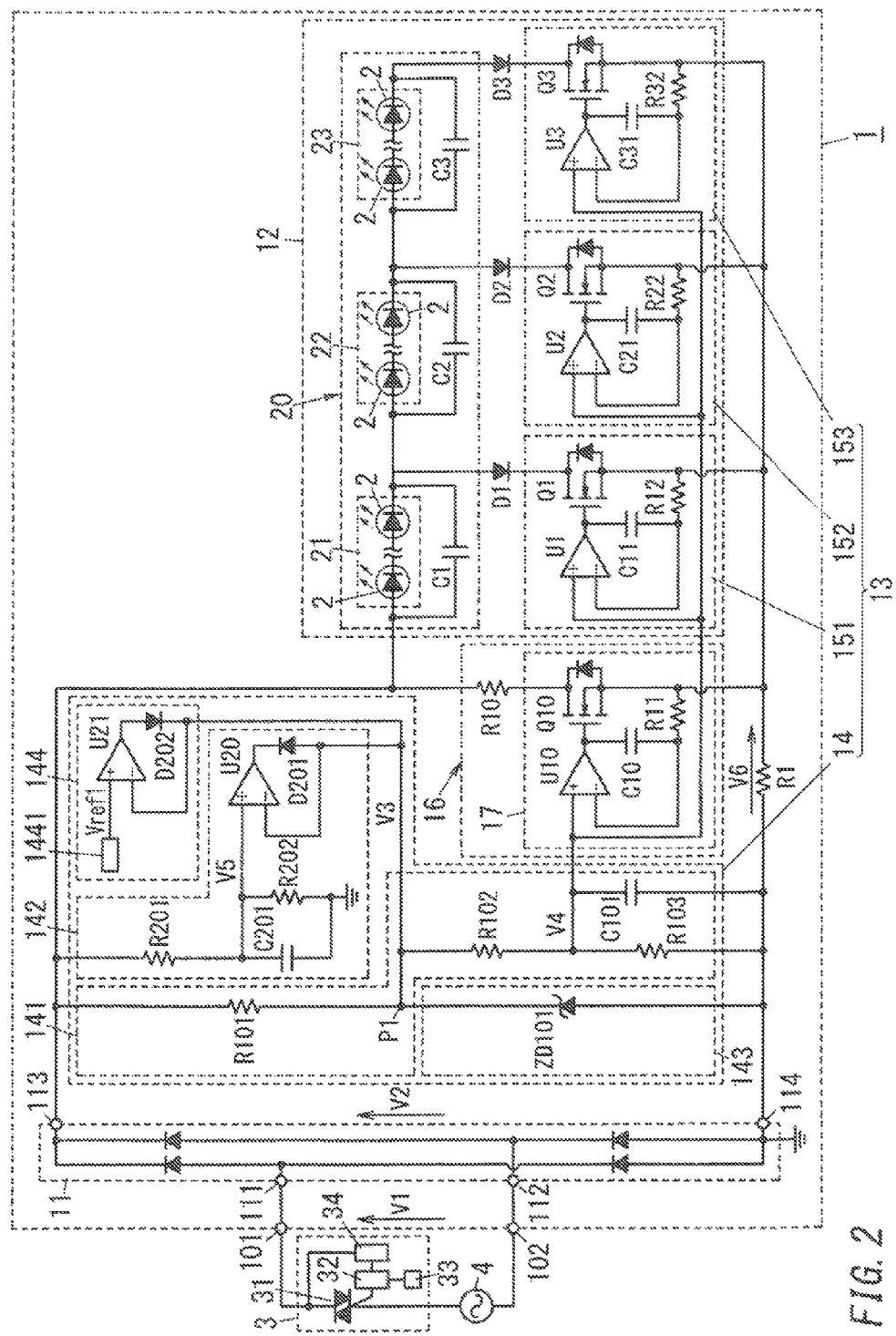
FIG. 2 is a circuit diagram illustrating the lighting device of the First Embodiment.

FIG. 2 is a circuit diagram specifically illustrating the lighting device 1. Hereinafter, the circuit configuration of the lighting device 1 will be described in detail with reference to FIG. 2. Note that, the circuit configuration of the lighting device 1 is not limited to the example shown in FIG. 2, but may be appropriately modified.

Between the input terminals 101 and 102, a dimmer 3 and an AC power supply 4 such as a commercial power supply (for example, an AC power supply of AC100V, 50 Hz or 60 Hz) are connected in series.

The dimmer 3 will be described below with reference to FIG. 2. The dimmer 3 includes a switching element 31, a drive circuit 32, a setting part 33 and a power supply circuit 34, for example. The switching element 31 is a semiconductor switching element such as a TRIAC. The switching element 31 is connected between the input terminal 101 and the AC power supply 4. The setting part 33 has an operation part that is movable within a prescribed operational range, and sets a target value for a dimming level in response to a position of the operation part. The drive circuit 32 turns on the switching element 31 at a timing when a phase angle of a power supply voltage of the AC power supply 4 reaches a phase angle corresponding to the target value set by the setting part 33 after the power supply voltage falls into zero. When turned on temporarily, the switching element 31 is maintained in an ON-state until the power supply voltage of the AC power supply 4 again falls into zero. That is, the switching element 31 is in ON at only a conduction angle (an ON-period) corresponding to the target value set by the setting part 33. Therefore, the AC voltage V1 is a voltage obtained by the dimmer 3 phase-controlling the power supply voltage output from the AC power supply 4. The drive circuit 32 turns on the switching element 31 at the conduction angle of 180°, when the target value for the dimming level is set to 100% by the dimmer 3. The AC voltage V1 therefore becomes equal to the AC power supply voltage output from the AC power supply 4.

The rectifier circuit 11 includes a diode-bridge. Input terminals 111 and 112 of the rectifier circuit 11 are respectively connected to the input terminals 101 and 102. The load circuit 20 is connected between output terminals 113 and 114 of the rectifier circuit 11. The "input terminal" mentioned herein may be a component (a terminal) for connecting an electric wire or the like, but may be, for example, a lead of an electronic component, or part of an electric conductor formed as wiring on a circuit substrate.

The AC voltage V1 is input to the input terminals 111 and 112 of the rectifier circuit 11 via the dimmer 3. The AC voltage V1 is the AC power supply voltage output from the AC power supply 4, or an AC voltage obtained by the dimmer 3 phase-controlling the AC power supply voltage output from the AC power supply 4. The rectifier circuit 11 is configured to perform full-wave rectification on the AC voltage V1 to generate a pulsating voltage V2 between the output terminals 113 and 114. In order to protect the lighting device 1 from a surge voltage, a protection element such as a varistor (not shown) may be connected between the input terminals 111 and 112 of the rectifier circuit 11. Also a fuse (not shown) may be connected between the AC power supply 4 and the rectifier circuit 11.

The load circuit 20 includes two or more solid light sources 2 that are connected in series. Each solid light source 2 is an SMD (surface mount device) type of light-emitting diode, for example. The two or more solid light sources 2 may be grouped into two or more light source groups connected in series. In the present embodiment, as one example, the two or more solid light sources 2 are grouped into three light source groups 21, 22 and 23. That is, each of the two or more solid light sources 2 belongs to any one of three light source groups 21, 22 and 23. In the present embodiment, series-connected solid light sources 2 are divided into light source groups 21, 22 and 23. The three light source groups 21, 22 and 23 are connected in series in a direction in which current flows from the output terminal 113 to the output terminal 114 between the output terminals 113 and 114 of the rectifier circuit 11.

Here, ON-voltages when the light source groups 21, 22 and 23 are turned on are assigned with V21, V22 and V23, respectively. For example, in case a forward voltage of each solid light source 2 is 3.1[V] and the number of solid light sources 2 constituting the light source group 21 is 14, the ON-voltage V21 is 3.1×14=43.4[V]. Also in case the number of solid light sources 2 constituting the light source group 22 is 13, the ON-voltage V22 is 3.1×13=40.3[V]. Also in case the number of solid light sources 2 constituting the light source group 23 is 12, the ON-voltage V23 is 3.1×12=37.2[V].

In the present embodiment, capacitors C1, C2 and C3 are respectively connected in parallel with the light source groups 21, 22 and 23. The capacitors C1, C2 and C3 are, for example, aluminum electrolytic capacitors. The respective capacitors C1, C2 and C3 are to alleviate changes in currents flowing through the light source groups 21, 22 and 23, which can reduce the ripple in the output light. The capacitors C1, C2 and C3 respectively connected in parallel with the light source groups 21, 22 and 23 are not essential components for the lighting device 1, and may be appropriately omitted.

An electrostatic capacity of the capacitor C1 may be set so that a time constant to be determined by an equivalent resistance of the light source group 21 and the electrostatic capacity is more than a period of the pulsating voltage V2. Similarly, an electrostatic capacity of the capacitor C2 may be set so that a time constant to be determined by an equivalent resistance of the light source group 22 and the electrostatic capacity is more than the period of the pulsating voltage V2. Also, an electrostatic capacity of the capacitor C3 may be set so that a time constant to be determined by an equivalent resistance of the light source group 23 and the electrostatic capacity is more than the period of the pulsating voltage V2. As the capacitors C1, C2 and C3 are set to have larger electrostatic capacities, the ripple in the output light can be more reduced. However, in this case, there is a problem that sizes of the capacitors C1, C2 and C3 are increased and a circuit loss is therefore increased.

The drive circuit 12 is configured to change the number of the two or more solid light sources 2 which emit light, according to a change in a voltage value of the pulsating voltage V2, so that a period of the pulsating voltage V2 includes the first time period and the second time period. In the present embodiment, the drive circuit 12 is configured to increase the number of solid light sources 2 emitting light, according to an increase in the voltage value of the pulsating voltage V2, and decrease the number of solid light sources 2 emitting light, according to a decrease in the voltage value of the pulsating voltage V2.

Furthermore, in the present embodiment, the drive circuit 12 is configured to change the number of the three light source groups 21, 22 and 23 which emit light, according to the change in the voltage value of the pulsating voltage V2, so as to change the number of solid light sources 2 emitting light.

The drive circuit 12 includes diodes D1 to D3 that are rectifying elements. The diode D1 has: an anode that is connected to a low-potential side end (a cathode side end) of the light source group 21; and a cathode that is connected to one end of a resistor R1 for detecting current via a constant current circuit 151. The diode D2 has: an anode that is connected to a low-potential side end of the light source group 22; and a cathode that is connected to the one end of the resistor R1 via a constant current circuit 152. The diode D3 has: an anode that is connected to a low-potential side end of the light source group 23; and a cathode that is connected to the one end of the resistor R1 via a constant current circuit 153. Another end of the resistor R1 is connected to the low-potential side output terminal 114 of the rectifier circuit 11. That is, the drive circuit 12 includes the diodes D1, D2 and D3 that respectively correspond to the light source groups 21, 22 and 23. Each of the diodes D1, D2 and D3 is connected between: the low-potential side end of a corresponding light source group of the light source groups 21, 22 and 23; and the low-potential side output terminal 114 of the paired output terminals 113 and 114. The current control circuit 13 includes the constant current circuits 151, 152 and 153 that respectively correspond to the diodes D1, D2 and D3. Each of the constant current circuits 151, 152 and 153 is connected between: a corresponding diode of the diodes D1, D2 and D3; and the low-potential side output terminal 114 of the paired output terminals 113 and 114.

In the lighting device 1 of the present embodiment, the drive circuit 12 directly applies, to the load circuit 20, the pulsating voltage V2 generated by the rectifier circuit 11.

For a time period(s) during which the voltage value of the pulsating voltage V2 is less than the ON-voltage V21 (time periods T1 and T7 in FIG. 3), no current flows through all of the light source groups 21, 22 and 23, and the drive circuit 12 causes all of the light source groups 21, 22 and 23 to turn off. In this case, input current I1 flows along a route RT1 denoted by a dotted line in FIG. 4A, namely, a route of returning to the output terminal 114 of the rectifier circuit 11 from the output terminal 113 of the rectifier circuit 11 through the shunt circuit 16. Hereinafter, an operation mode in which the input current I1 flows along the route RT1 is referred to as a "first mode".

Figure 3:
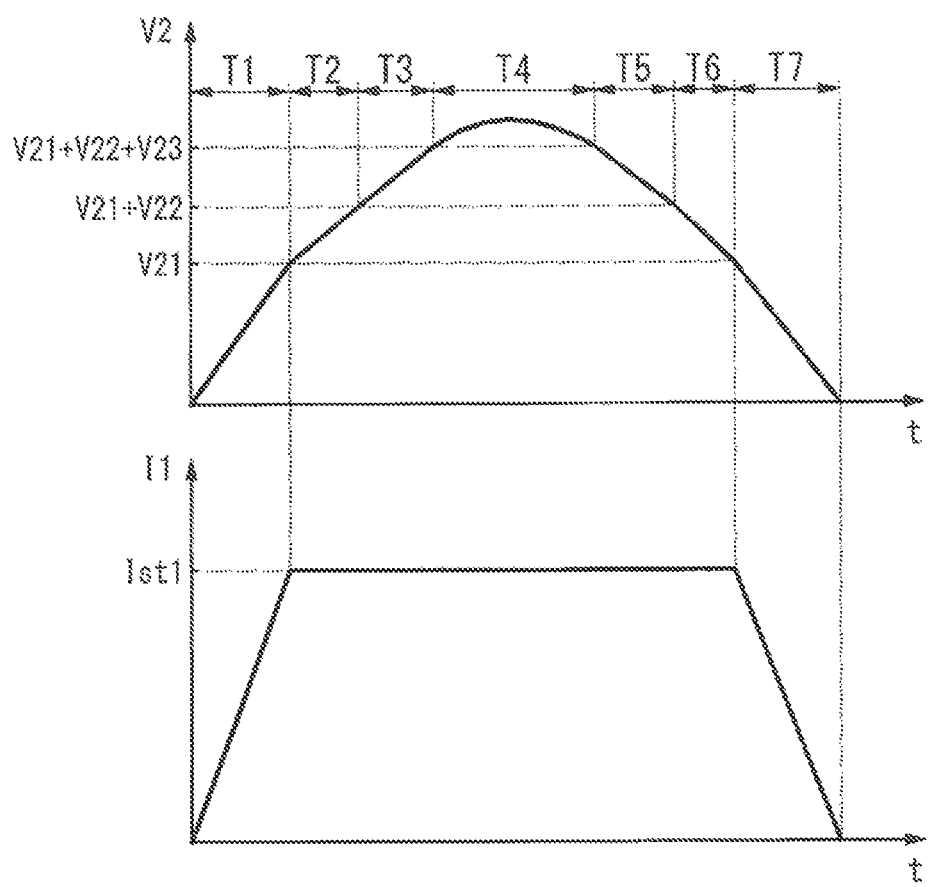
FIG. 3 is a waveform chart of a pulsating voltage output from a rectifier circuit and input current in the lighting device of the First Embodiment.
Figure 4:
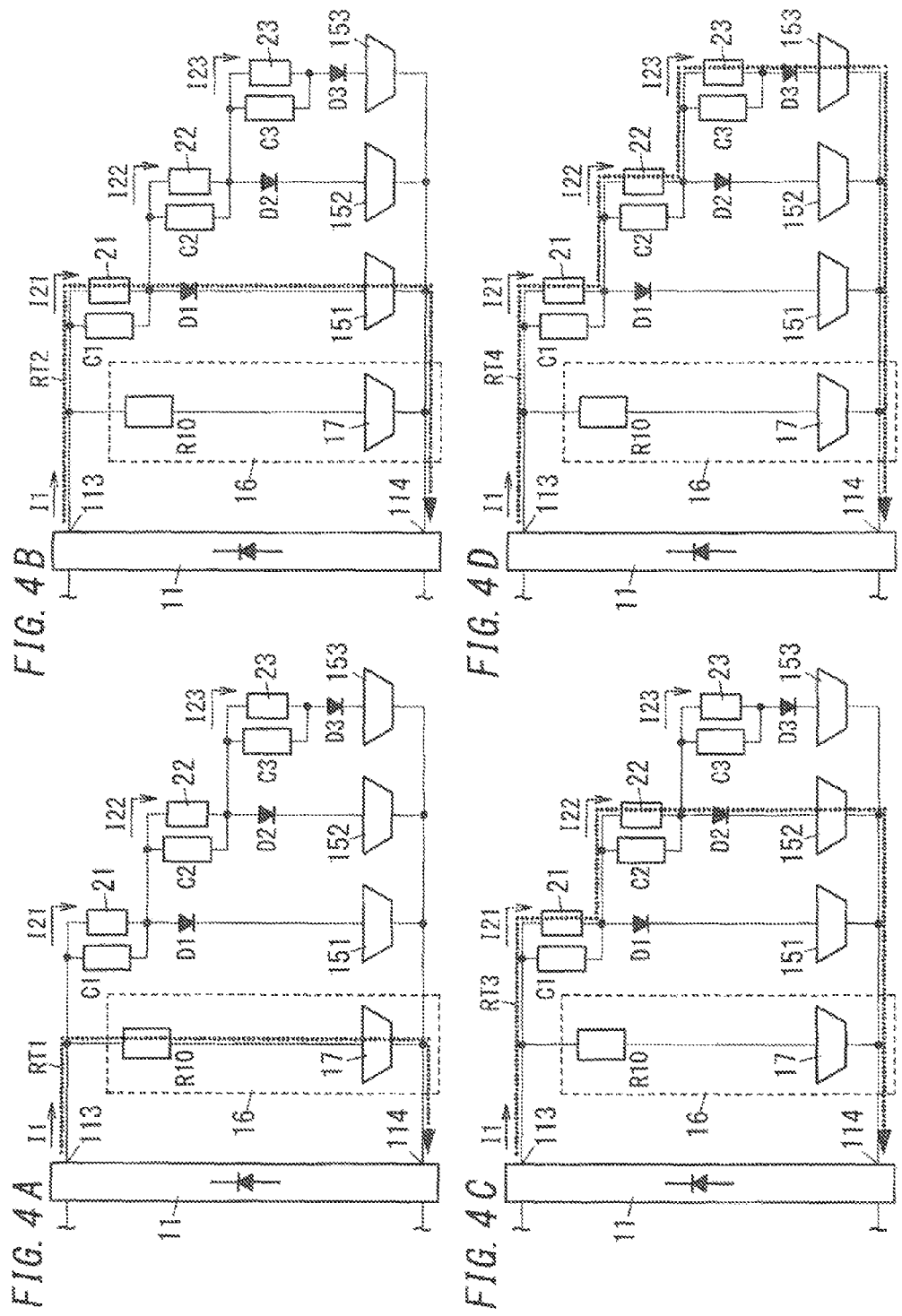
FIG. 4A is a circuit diagram for explaining a route through which current flows in a first mode of the lighting device of the First Embodiment.
FIG. 4B is a circuit diagram for explaining a route through which current flows in a second mode of the lighting device of the First Embodiment.
FIG. 4C is a circuit diagram for explaining a route through which current flows in a third mode of the lighting device of the First Embodiment.
FIG. 4D is a circuit diagram for explaining a route through which current flows in a fourth mode of the lighting device of the First Embodiment.

Solid light sources 2 of the light source group 21 and the diode D1 are in an on-state for a time period(s) during which the voltage value of the pulsating voltage V2 is equal to or more than the ON-voltage V21 and less than the sum of the ON-voltages V21 and V22 (time periods T2 and T6 in FIG. 3). The "diode is in an on-state" mentioned herein means a state in which the diode is forward-biased. That is, the light source 2 and diode D1 are conducting in this state. The drive circuit 12 causes current to flow through the solid light sources 2 of the light source group 21, the diode D1, the constant current circuit 151 and the resistor R1 so as to make the light source group 21 emit light. In this case, the input current I1 flows along a route RT2 denoted by a dotted line in FIG. 4B, namely, a route of returning to the output terminal 114 of the rectifier circuit 11 from the output terminal 113 of the rectifier circuit 11 through the light source group 21, the diode D1 and the constant current circuit 151. Current I21 (input current I1) flowing through the light source group 21 is controlled so as to be at a prescribed value Ist1 by the constant current circuit 151 (refer to FIG. 3). The drive circuit 12 does not cause current to flow through solid light sources 2 of the light source groups 22 and 23 so that the light source groups 22 and 23 are turned off. Hereinafter, an operation mode in which the input current I1 flows along the route RT2 is referred to as a "second mode".

Solid light sources 2 of the light source groups 21 and 22 and the diode D2 are in an on-state for a time period(s) during which the voltage value of the pulsating voltage V2 is equal to or more than the sum of the ON-voltages V21 and V22 and less than the sum of the ON-voltages V21, V22 and V23 (time periods T3 and T5 in FIG. 3). The drive circuit 12 causes current to flow through the solid light sources 2 of the light source groups 21 and 22, the diode D2, the constant current circuit 152 and the resistor R1 so as to make the light source groups 21 and 22 emit light. In this case, input current I22 (input current I1) flows along a route RT3 denoted by a dotted line in FIG. 4C, namely, a route of returning to the output terminal 114 of the rectifier circuit 11 from the output terminal 113 of the rectifier circuit 11 through the light source groups 21 and 22, the diode D2 and the constant current circuit 152. The current flowing through the light source groups 21 and 22 is controlled so as to be at a prescribed value Ist1 by the constant current circuit 152. The drive circuit 12 does not cause current to flow through solid light sources 2 of the light source group 23 so that the light source group 23 is turned off. Hereinafter, an operation mode in which the input current I1 flows along the route RT3 is referred to as a "third mode".

All of the two or more solid light sources 2 of the light source groups 21, 22 and 23 and the diode D3 are in an on-state for a time period during which the voltage value of the pulsating voltage V2 is equal to or more than the sum of the ON-voltages V21, V22 and V23 (a time period T4 in FIG. 3). The drive circuit 12 causes current to flow through the solid light sources 2 of the light source groups 21, 22 and 23, the diode D3, the constant current circuit 153 and the resistor R1 so as to make all of the light source groups 21, 22 and 23 emit light. In this case, input current I23 (input current I1) flows along a route RT4 denoted by a dotted line in FIG. 4D, namely, a route of returning to the output terminal 114 of the rectifier circuit 11 from the output terminal 113 of the rectifier circuit 11 through the light source groups 21, 22 and 23, the diode D3 and the constant current circuit 153. The current flowing through the light source groups 21, 22 and 23 is controlled so as to be at a prescribed value Ist1 by the constant current circuit 153. Hereinafter, an operation mode in which the input current I1 flows along the route RT4 is referred to as a "fourth mode". The time period during which the voltage value of the pulsating voltage V2 is equal to or more than the sum of the ON-voltages V21, V22 and V23, mentioned here, corresponds to the second time period during which all of the two or more solid light sources 2 emit light. A time period(s) during which the voltage value of the pulsating voltage V2 is equal to or more than the ON-voltage V21 and less than the sum of the ON-voltages V21, V22 and V23 corresponds to the first time period during which a part of the two or more solid light sources 2 emits light and other of the two or more solid light sources 2 do not emit light.

The current control circuit 13 includes a setting circuit 14 and the constant current circuits 151, 152 and 153 (refer to FIG. 2).

The setting circuit 14 includes a dividing circuit 141, an average value circuit 142, a limiter circuit 143 and a lower-limit setting circuit 144.

The dividing circuit 141 is configured to generate a reference voltage V3 proportional to the voltage value (an instantaneous value) of the pulsating voltage V2 generated by the rectifier circuit 11.

The dividing circuit 141 includes resistors R101, R102 and R103, and a capacitor C101. One end of the resistor R101 is connected to the output terminal 113 of the rectifier circuit 11, and another end of the resistor R101 is connected to one end of the resistor R102. Another end of the resistor R102 is connected to one end of the resistor R103, and another end of the resistor R103 is connected to the output terminal 114 of the rectifier circuit 11. The capacitor C101 is connected in parallel with the resistor R103.

The dividing circuit 141 generates the reference voltage V3 at a connection point P1 between the resistors R101 and R102, the reference voltage V3 being obtained by dividing the pulsating voltage V2 with the resistor R101 and a combined resistor of the resistors R102 and R103. Output ends of the average value circuit 142, the limiter circuit 143 and the lower-limit setting circuit 144 are connected to the connection point P1. Accordingly, if an output voltage of the average value circuit 142 is less than the reference voltage V3, a voltage at the connection point P1 becomes the output voltage of the average value circuit 142. On the other hand, if the output voltage of the average value circuit 142 is equal to or more than the reference voltage V3, the voltage at the connection point P1 becomes the reference voltage V3. The limiter circuit 143 sets an upper limit of the voltage at the connection point P1, and the lower-limit setting circuit 144 sets a lower limit of the voltage at the connection point P1.

The dividing circuit 141 outputs a voltage V4 obtained by dividing the voltage at the connection point P1 with the resistors R102 and R103 to the constant current circuits 151, 152 and 153 and a constant current circuit 17 of the shunt circuit 16.

The resistors R101 to R103 and the capacitor C101 constitute a filter circuit that reduces noise from the AC power supply 4, which can reduce a possibility that the constant current circuits 151 to 153 and 17 are erroneously operated due to the noise. The filter circuit constituted by the resistors R101 to R103 and the capacitor C101 is set to have a time constant equal to or less than 1 millisecond so that the output voltage V4 of the dividing circuit 141 is made to change in a period of the pulsating voltage V2.

The average value circuit 142 includes resistors R201 and R202, a capacitor C201, an operational amplifier U20 and a diode D201. One end of the resistor R201 is connected to the high-potential side output terminal 113 of the rectifier circuit 11. The resistor R202 is connected between another end of the resistor R201 and the low-potential side output terminal 114 of the rectifier circuit 11. The capacitor C201 is connected in parallel with the resistor R202. The operational amplifier U20 has a positive input terminal (non-inversion input terminal) connected to a connection point between the resistors R201 and R202. The operational amplifier U20 further has: a negative input terminal (inversion input terminal) connected to an anode of the diode D201; and an output terminal connected to a cathode of the diode D201. The anode of the diode D201 is connected to a connection point between the resistors R101 and R102. The pulsating voltage V2 generated by the rectifier circuit 11 is divided with the resistors R201 and R202, and then averaged by a low-pass filter that is constituted by the resistor R202 and the capacitor C201. When an output voltage V5 of the average value circuit 142 (i.e., a voltage across the capacitor C201) is lower than the reference voltage V3, the diode D2 is turned on, and accordingly a voltage at the connection point between the resistors R101 and R102 becomes the output voltage V5 of the average value circuit 142.

The low-pass filter constituted by the resistor R202 and the capacitor C201 is preferably set to have a time constant equal to or more than twice a period of the AC voltage V1 so that the output voltage V5 of the average value circuit 142 is made not to change in a period of the pulsating voltage V2. For example, in case the AC voltage V1 has a frequency of 50 Hz, the low-pass filter constituted by the resistor R202 and the capacitor C201 is preferably set to have a time constant equal to or more than 40 milliseconds.

The limiter circuit 143 includes a Zener diode ZD101 having: a cathode connected to the connection point P1; and an anode connected to the output terminal 114. The limiter circuit 143 limits the upper limit of the voltage at the connection point P1 into a Zener voltage of the Zener diode ZD101. The voltage value of the pulsating voltage V2, at a time point when the voltage value at the connection point P1 becomes equal to the Zener voltage of the Zener diode ZD101, is set to a threshold. In other words, the limiter circuit 143 limits the voltage at the connection point P1 into the Zener voltage, when the output voltage of the average value circuit 142 exceeds the Zener voltage (upper limit) of the Zener diode ZD101. The average voltage of the pulsating voltage V2, at a time point when the average voltage of the pulsating voltage V2 (i.e., the output voltage of the average value circuit 142) becomes equal to the Zener voltage of the Zener diode ZD101, is set to the threshold. When the average voltage of the pulsating voltage V2 is equal to or more than the threshold, the limiter circuit 143 limits the voltage at the connection point P1 into the Zener voltage (upper limit) of the Zener diode ZD101 so as to limit current flowing through the load circuit 20 into a prescribed value. In the present embodiment, the dividing circuit 141 is configured to generate the reference voltage V3 so as to be made higher than the Zener voltage of the Zener diode ZD101, when the voltage value (instantaneous value) of the pulsating voltage V2 is equal to or more than the ON-voltage V21.

The lower-limit setting circuit 144 includes a constant voltage source 1441, an operational amplifier U21 and a diode D202. The operational amplifier U21 has a positive input terminal connected to the constant voltage source 1441 so that the positive input terminal receives a constant bias voltage Vref1 from the constant voltage source 1441. The operational amplifier U21 further has: a negative input terminal (inversion input terminal) connected to a cathode of the diode D202; and an output terminal connected to an anode of the diode D202. The cathode of the diode D202 is connected to the connection point P1. When the voltage at the connection point P1 is higher than the bias voltage Vref1, the diode D202 is turned off. On the other hand, when the voltage at the connection point P1 is lower than the bias voltage Vref1, the diode D202 is turned on, and accordingly the voltage at the connection point P1 becomes equal to the bias voltage Vref1. The lower-limit setting circuit 144 therefore limits the lower limit of the voltage at the connection point P1 into the bias voltage Vref1.

Figure 5:
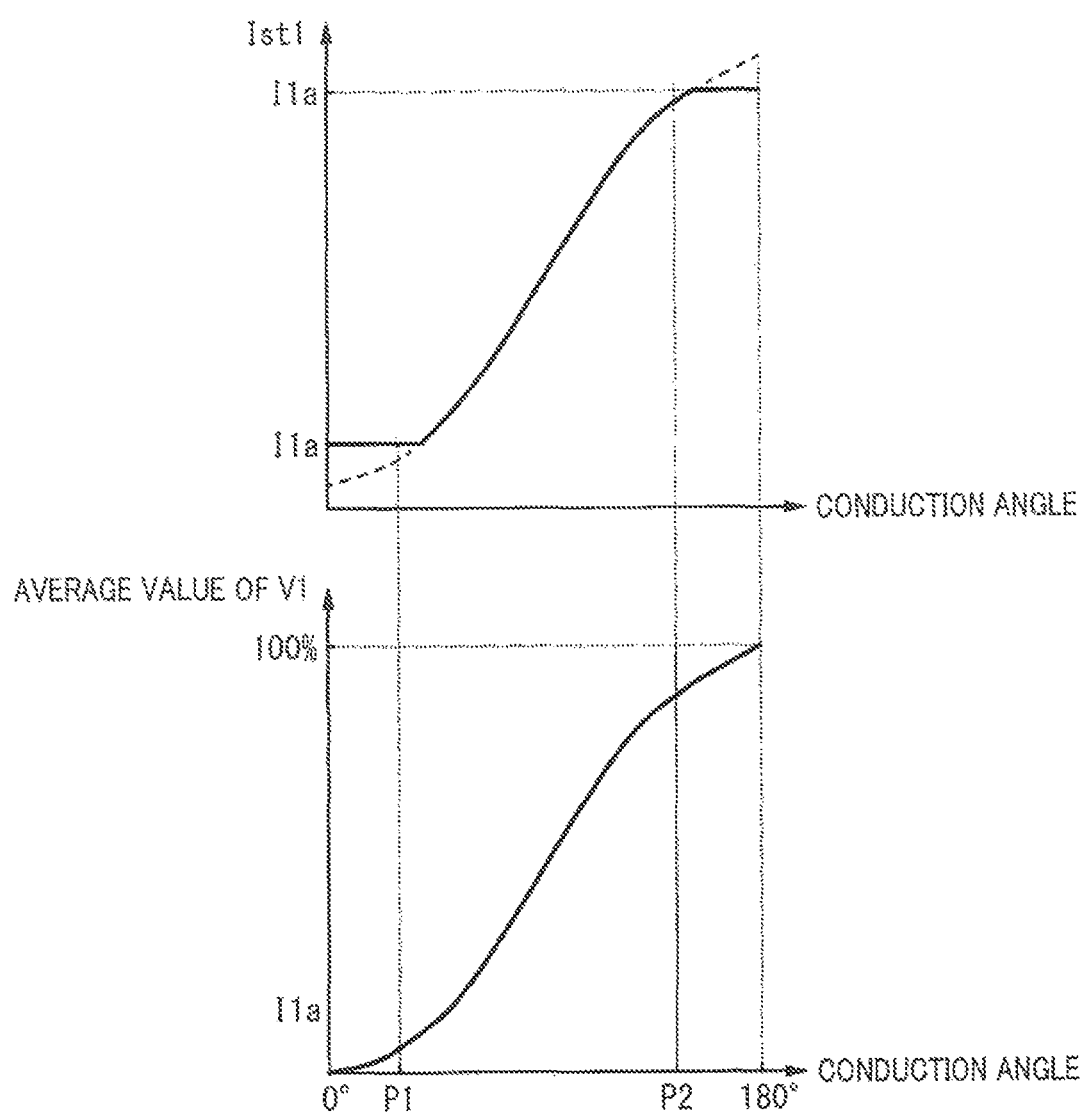
FIG. 5 is a graph for explaining relation between an average value of an input voltage input to the lighting device of the First Embodiment and a target value of current flowing through a load circuit.

FIG. 5 is a graph for explaining relation between an average value of an input voltage (AC voltage V1) input to the lighting device 1 and a setting value Ist1 of the input current I1. The horizontal axis in FIG. 5 represents a conduction angle of the AC voltage V1, and the average value of the AC voltage V1 changes, depending on the conduction angle changing between 0° and 180°. When the conduction angle is in a range near 0° (i.e., when the switching element 31 of the dimmer 3 is near in a complete OFF-state), or in a range near 180° (i.e., when the switching element 31 is near in a complete ON-state), the average value of the AC voltage V1 gently changes with respect to a change in the conduction angle.

In case the dimmer 3 is a two-wire type, and the dimmer 3 and the lighting device 1 are connected in series to the AC power supply 4, the power supply circuit 34 of the dimmer 3 secures power to be required for operation of the dimmer 3, from the AC voltage V1 received via the lighting device 1. For this reason, the dimmer 3 sets an upper limit for the setting value Ist1 of the input current I1 so that the dimming level is set to be at maximum when the conduction angle is equal to or more than a value P2 (e.g., 150°) rather than when the conduction angle is at 180°. Furthermore, in order to avoid that the light source groups 21 to 23 fall in an unstable lighting state, the dimmer 3 sets a lower limit for the setting value Ist1 of the input current I1 so that the dimming level is set to be at minimum when the conduction angle is equal to or less than a value P1 (e.g., 30°). The setting value Ist1 of the input current I1 is set to a lower limit I1b by the lower-limit setting circuit 144 setting the lower limit for the voltage at the connection point P1 (that is, the output voltage V4). Also the setting value Ist1 of the input current I1 is set to an upper limit I1a by the limiter circuit 143 setting the upper limit for the voltage at the connection point P1 (that is, the output voltage V4).

Next, the constant current circuits 151, 152 and 153 will be described.

The constant current circuit 151 includes a transistor Q1, an operational amplifier U1, a capacitor C11 and a resistor R12. The transistor Q1 is, for example, an enhancement type n-channel MOSFET (Metal-Oxide-Semiconductor Field Effect Transistor). A drain electrode of the transistor Q1 is connected to the cathode of the diode D1. A source electrode of the transistor Q1 is connected to the resistor R1. A gate electrode of the transistor Q1 is connected to an output terminal of the operational amplifier U1. A positive input terminal of the operational amplifier U1 is connected to the connection point between the resistors R102 and R103. The output voltage V4 of the setting circuit 14 is input to the positive input terminal of the operational amplifier U1. A negative input terminal of the operational amplifier U1 is connected to the output terminal of the operational amplifier U1 via the capacitor C11. Also the negative input terminal of the operational amplifier U1 is connected to the source electrode of the transistor Q1 via the resistor R12.

The solid light sources 2 of the light source group 21 and the diode D1 are in an on-state for a time period during which the voltage value of the pulsating voltage V2 is equal to or more than the ON-voltage V21 and less than the sum of the ON-voltages V21 and V22. For this time period, the transistor Q1 is in on, and accordingly current flows to the output terminal 114 of the rectifier circuit 11 after passing through the light source group 21, the diode D1, the transistor Q1 and the resistor R1 from the output terminal 113 of the rectifier circuit 11. Then, a voltage V6, depending on the value of the current flowing through the transistor Q1, is generated across the resistor R1 for detecting current. The voltage V6 generated across the resistor R1 is input to the negative input terminal of the operational amplifier U1 via the resistor R12. Since the operational amplifier U1 generates a voltage depending on a differential voltage between the output voltage V4 of the setting circuit 14 and the voltage V6 across the resistor R1, the current flowing through the transistor Q1 is controlled to a prescribed value corresponding to the output voltage V4 of the setting circuit 14.

While the other constant current circuits 152 and 153 perform constant current control for current flowing through the load circuit 20, the operational amplifier U1 of the constant current circuit 151 cuts off or reduces drain current of the transistor Q1. The respective transistors Q1, Q2 and Q3 of the constant current circuits 151, 152 and 153 are therefore operated exclusively.

The capacitor C11 and the resistor R12 of the constant current circuit 151 constitute a phase compensation circuit, which can prevent the operational amplifier U1 from oscillating.

Since the constant current circuits 152 and 153 have a circuit configuration similar to that of the constant current circuit 151, detail explanations thereof are omitted. The constant current circuit 152 includes a "transistor Q2", an "operational amplifier U2", a "capacitor C21" and a "resistor R22" respectively similar to the "transistor Q1", the "operational amplifier U1", the "capacitor C11" and the "resistor R12" of the constant current circuit 151. The constant current circuit 153 includes a "transistor Q3", an "operational amplifier U3", a "capacitor C31" and a "resistor R32" respectively similar to the "transistor Q1", the "operational amplifier U1", the "capacitor C11" and the "resistor R12" of the constant current circuit 151. In the present embodiment, the transistors Q1, Q2 and Q3 are MOSFETs, but may be bipolar transistors.

Next, the shunt circuit 16 will be described.

The shunt circuit 16 includes a resistor R10 and a constant current circuit 17.

One end of the resistor R10 is connected to the high-potential side output terminal 113 of the rectifier circuit 11. Another end of the resistor R10 is connected to the resistor R1 via the constant current circuit 17. While all of the light source groups 21, 22 and 23 are in an off-state and no current flows through the constant current circuits 151, 152 and 153, current flows into the output terminal 114 of the rectifier circuit 11 from the output terminal 113 of the rectifier circuit 11 via the resistor R10 and the constant current circuit 17.

The constant current circuit 17 includes a transistor Q10, an operational amplifier U10, a capacitor C10 and a resistor R11. Since the constant current circuit 17 has a circuit configuration similar to that of the constant current circuits 151 to 153, detail explanation thereof is omitted. In the constant current circuit 17, the "transistor Q10", the "operational amplifier U10", the "capacitor C10" and the "resistor R11" are respectively similar to the "transistor Q1", the "operational amplifier U1", the "capacitor C11" and the "resistor R12" of the constant current circuit 151. In the present embodiment, the transistor Q10 is a MOSFET, but may be a bipolar transistor.

The constant current circuit 17 controls a value of current flowing through the resistor R10 to a prescribed value corresponding to the output voltage V4 of the setting circuit 14, while all of the light source groups 21, 22 and 23 are in an OFF-state.

(2.2) Operation

Operation of the lighting device 1 of the present embodiment will be described below with reference to FIG. 6.

Figure 6:
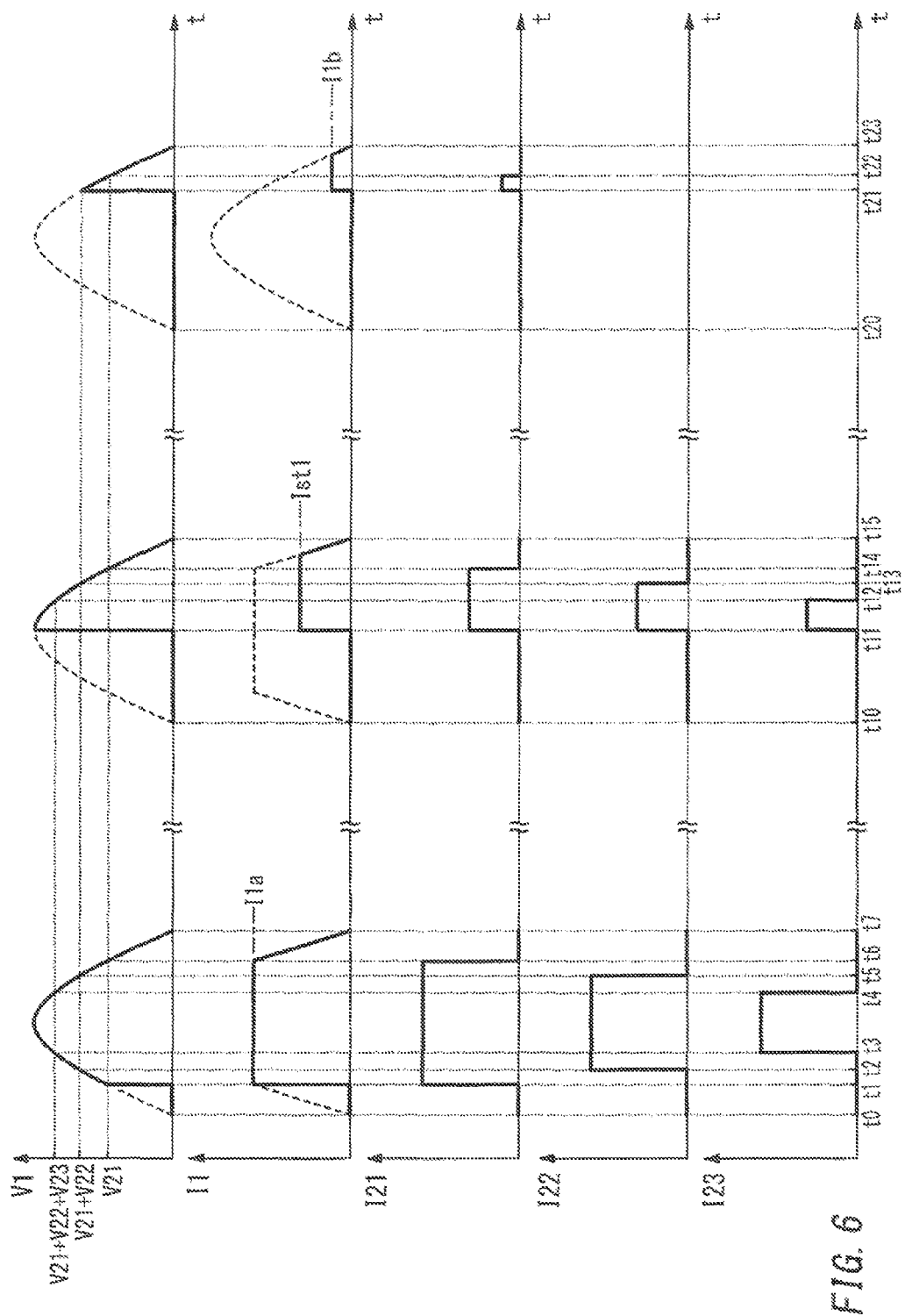
FIG. 6 is a waveform chart for explaining operation of the lighting device of the First Embodiment.

FIG. 6 is a waveform chart for explaining the operation of the lighting device 1. FIG. 6 illustrates waveform charts of the AC voltage V1, the input current I1, the current I21, the current I22 and the current I23 in this order from above of FIG. 6. On the left side of FIG. 6, waveform charts are shown, where the dimming level is at maximum (100%). On the center of FIG. 6, waveform charts are shown, where the dimming level is at 50%. On the right side of FIG. 6, waveform charts are shown, where the dimming level is at a lower limit.

(2.2.1) Operation in Case Dimming Level is at Maximum

The switching element 31 of the dimmer 3 is in off and the AC voltage V1 is at zero during a time period between a time t0 and a time t1, and therefore all of the light source groups 21, 22 and 23 are in off and current flows through the shunt circuit 16. During this time period, the pulsating voltage V2 is at zero, and a voltage input from the resistor R101 is also at zero, and accordingly, the voltage at the connection point P1 is set to the lower limit (bias voltage Vref1) by the lower-limit setting circuit 144. That is, the setting circuit 14 sets the setting value Ist1 of the input current I1 to the lower limit I1b. In this time period, consumption current by an internal circuit (e.g., the power supply circuit 34) of the dimmer 3 flows via the shunt circuit 16.

At the time t1, the switching element 31 of the dimmer 3 is turned on, and the AC voltage V1 is input to the lighting device 1. If the AC voltage V1 at the time t1 is less than the ON-voltage V21, all of the light source groups 21, 22 and 23 are turned off and the lighting device 1 falls into a state of causing current to flow through the shunt circuit 16. Current flowing through the resistor R10 is controlled by the constant current circuit 17.

In the present embodiment, during the time period between the time t1 and the time t2 (first time period), since the AC voltage V1 is equal to or more than the ON-voltage V21 and less than the sum of the ON-voltages V21 and V22, the drive circuit 12 causes current to flow through the light source group 21, and the light source group 21 therefore emits light. In case the dimming level is at maximum, the output voltage of the average value circuit 142 is more than the reference voltage V3. When the pulsating voltage V2 is equal to or more than the ON-voltage V21, the voltage obtained by dividing the pulsating voltage V2 exceeds the Zener voltage of the Zener diode ZD101, and the voltage at the connection point P1 is accordingly limited into the Zener voltage of the Zener diode ZD101, and the setting value Ist1 of the input current I1 is limited into the upper limit I1a. The constant current circuit 151 therefore controls the current I21 (input current I1) flowing through the light source group 21 into the upper limit I1a. Since the current flowing through the solid light sources 2 of the light source group 21 becomes constant and a peak value of the input current I1 is reduced, the ripple in the output light can be reduced. Furthermore, since the peak value of the input current I1 is reduced, an element with a small current capacity can be used as the solid light sources 2, an electrostatic capacity of the capacitor C1 can be reduced.

During a time period between the time t2 and a time t3 (first time period), since the AC voltage V1 is equal to or more than the sum of the ON-voltages V21 and V22 and less than the sum of the ON-voltages V21, V22 and V23, the drive circuit 12 causes current to flow through the light source groups 21 and 22, and the light source groups 21 and 22 therefore emits light.

During a time period between the time t3 and a time t4 (second time period), since the AC voltage V1 is equal to or more than the sum of the ON-voltages V21, V22 and V23, the drive circuit 12 causes current to flow through the light source groups 21, 22 and 23, and the light source groups 21, 22 and 23 therefore emits light.

During a time period between the time t4 and a time t5 (first time period), since the AC voltage V1 is equal to or more than the sum of the ON-voltages V21 and V22 and less than the sum of the ON-voltages V21, V22 and V23, the drive circuit 12 causes current to flow through the light source groups 21 and 22, and the light source groups 21 and 22 therefore emits light.

During a time period between the time t5 and a time t6 (first time period), since the AC voltage V1 is equal to or more than the ON-voltage V21 and less than the sum of the ON-voltages V21 and V22, the drive circuit 12 causes current to flow through the light source group 21, and the light source group 21 therefore emits light.

During a time period between the time t6 and a time t7, since the AC voltage V1 is less than the ON-voltage V21, the drive circuit 12 causes current not to flow through the light source groups 21, 22 and 23, and the light source groups 21, 22 and 23 therefore do not emit light. In this time period, the input current I1 flows via the shunt circuit 16. As the AC voltage V1 is more reduced, the setting circuit 14 more reduces the setting value Ist1 of the input current I1, and maintains the setting value Ist1 at the lower limit I1b, when the setting value Ist1 is reduced to the lower limit I1b. When the AC voltage V1 is reduced to near zero volt, the input current I1 is limited by impedance of the shunt circuit 16, and accordingly, the input current I1 is reduced below the lower limit I1b.

The lighting device 1 repeatedly performs the operations from the time t0 to the time t7 for every half period of the AC voltage V1.

(2.2.2) Operation in Case Dimming Level is at 50%

The switching element 31 of the dimmer 3 is in off and the AC voltage V1 is at zero during a time period between a time t10 and a time t11, and therefore all of the light source groups 21, 22 and 23 are in off and current flows via the shunt circuit 16. During this time period, the setting circuit 14 sets the setting value Ist1 of the input current I1 to the lower limit I1b, and the consumption current by the internal circuit of the dimmer 3 flows via the shunt circuit 16.

At the time t11, the switching element 31 of the dimmer 3 is turned on, and the AC voltage V1 is input into the lighting device 1. During a time period between the time t11 and a time t12 (second time period), since the AC voltage V1 is equal to or more than the sum of the ON-voltages V21, V22 and V23, the drive circuit 12 causes current to flow through the light source groups 21, 22 and 23, and the light source groups 21, 22 and 23 therefore emit light. In case the dimming level is at 50%, since the average value of the AC voltage V1 is more reduced, compared with a case the dimming level is at maximum, the output voltage of the average value circuit 142 (voltage across the capacitor C201) is also more reduced, compared with the case the dimming level is at maximum. Accordingly, the setting circuit 14 sets the setting value Ist1 of the current I22 (input current I1) to a value corresponding to the output voltage of the average value circuit 142 (the average value of the AC voltage V1). Since the voltage across the capacitor C201 is constant in a period of the AC voltage V1, the setting value Ist1 of the current I22 (input current I1) is also constant in the period of the AC voltage V1.

Then, during a time period between the time t12 and a time t13 (first time period), since the AC voltage V1 is equal to or less than the sum of the ON-voltages V21 and V22 and less than the sum of the ON-voltages V21, V22 and V23, the drive circuit 12 causes current to flow through the light source groups 21 and 22, and the light source groups 21 and 22 therefore emits light.

During a time period between the time t13 and a time t14 (first time period), since the AC voltage V1 is equal to or more than the ON-voltage V21 and less than the sum of the ON-voltages V21 and V22, the drive circuit 12 causes current to flow through the light source group 21, and the light source group 21 therefore emits light.

During a time period between the time t14 and a time t15, since the AC voltage V1 is less than the ON-voltage V21, the drive circuit 12 causes current not to flow through the light source groups 21, 22 and 23, and the light source groups 21, 22 and 23 therefore do not emit light. In this time period, the input current I1 flows via the shunt circuit 16. As the AC voltage V1 is more reduced, the setting circuit 14 more reduces the setting value Ist1 of the input current I1, and maintains the setting value Ist1 at the lower limit I1b, when the setting value Ist1 is reduced to the lower limit I1b. When the AC voltage V1 is reduced to near zero volt, the input current I1 is limited by impedance of the shunt circuit 16, and accordingly, the input current I1 is reduced below the lower limit I1b.

The lighting device 1 repeatedly performs the operations from the time t10 to the time t15 for every half period of the AC voltage V1.

(2.2.3) Operation in Case Dimming Level is at Lower Limit

The operation of the lighting device 1 in case the dimming level is at a lower limit will be described below.

The switching element 31 of the dimmer 3 is in off and the AC voltage V1 is at zero during a time period between a time t20 and a time t21, and therefore all of the light source groups 21, 22 and 23 are in off and current flows via the shunt circuit 16. During this time period, the setting circuit 14 sets the setting value Ist1 of the input current I1 to the lower limit I1b, and the consumption current by the internal circuit of the dimmer 3 flows via the shunt circuit 16.

At the time t21, the switching element 31 of the dimmer 3 is turned on, and the AC voltage V1 is input into the lighting device 1. During a time period between the time t21 and a time t22 (first time period), since the AC voltage V1 is equal to or more than the ON-voltage V21 and less than the sum of the ON-voltages V21 and V22, the drive circuit 12 causes current to flow through the light source group 21, and the light source group 21 therefore emits light. Since the output voltage of the average value circuit 142 is reduced below the output voltage (bias voltage Vref1) of the lower-limit setting circuit 144, the voltage at the connection point P1 becomes equal to the bias voltage Vref1, and the setting circuit 14 sets the setting value Ist1 of the input current I1 to the lower limit I1b.

Then, during a time period between the time t22 and a time t23, since the AC voltage V1 is less than the ON-voltage V21, the drive circuit 12 causes current not to flow through the light source groups 21, 22 and 23, and the light source groups 21, 22 and 23 therefore do not emit light. In this time period, the input current I1 flows via the shunt circuit 16. When the AC voltage V1 is reduced to near zero volt, the input current I1 is limited by impedance of the shunt circuit 16, and accordingly, the input current I1 is reduced below the lower limit I1b.

The lighting device 1 repeatedly performs the operations from the time t20 to the time t23 for every half period of the AC voltage V1.

(3) Variations of First Embodiment (3.1) First Variation of First Embodiment

A lighting device 1 of First Variation of First Embodiment will be described below with reference to FIG. 7. In the lighting device 1 of First Variation, in case the voltage value of the pulsating voltage V2 is equal to or more than the ON-voltage V21 and less than a maximum amplitude, the dividing circuit 141 is set to have a voltage dividing ratio so that the voltage value of the reference voltage V3 does not exceed the upper limit of the limiter circuit 143. As a result, in case the dimming level is at maximum, the current control circuit 13 changes the input current I1 so as to be proportional to an instantaneous value of the AC voltage V1 within a range between the upper limit I1a and the lower limit I1b. The current control circuit 13 controls the input current I1 into a value corresponding to the average voltage of the pulsating voltage V2 in the second time period.

Figure 7:
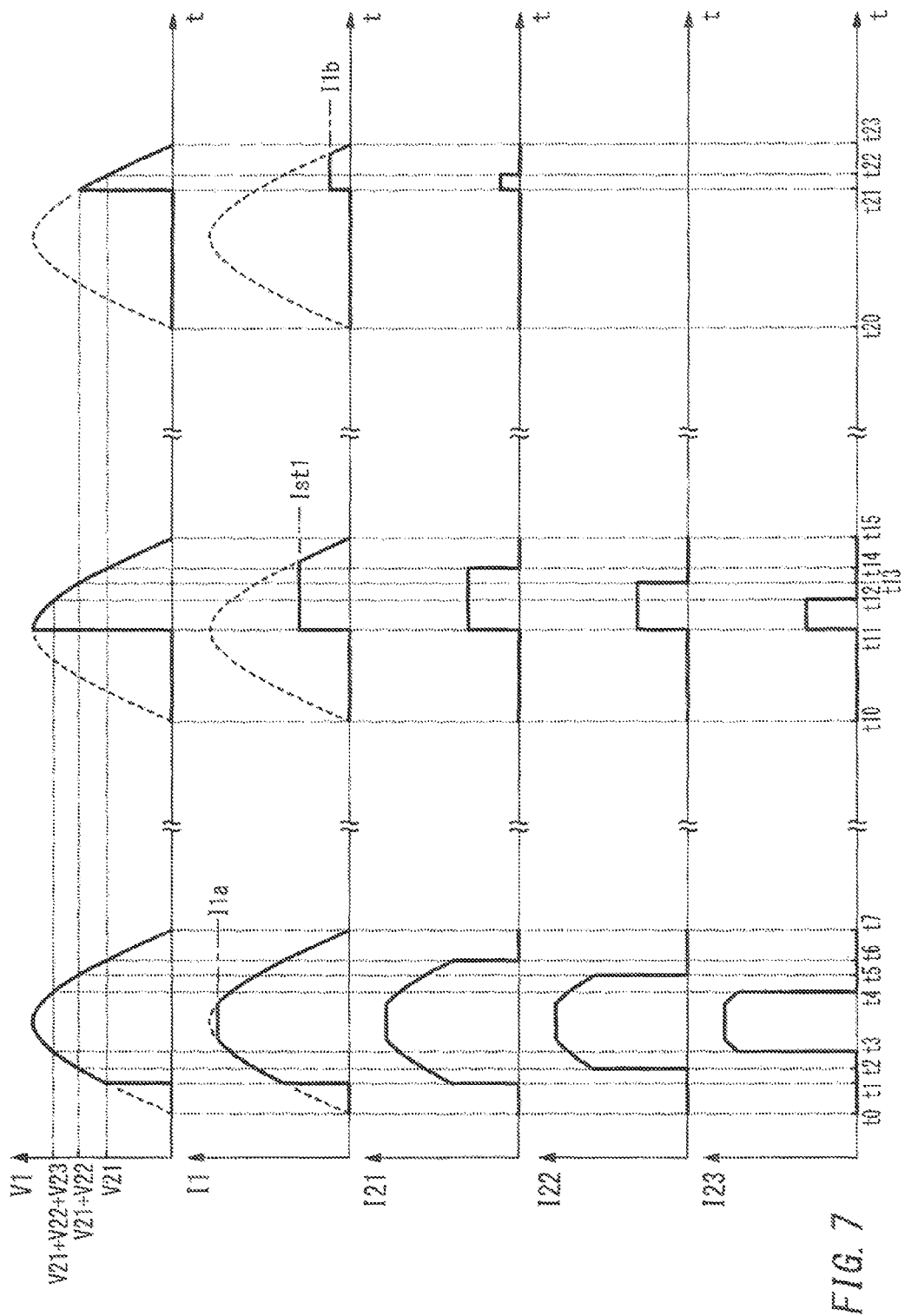
FIG. 7 is a waveform chart for explaining operation of a First Variation in the lighting device of the First Embodiment.

FIG. 7 is a waveform chart for explaining the operation of the lighting device 1. FIG. 7 illustrates waveform charts of the AC voltage V1, the input current I1, the current I21, the current I22 and the current I23 in this order from above of FIG. 7. On the left side of FIG. 7, waveform charts are shown, where the dimming level is at maximum (100%). On the center of FIG. 7, waveform charts are shown, where the dimming level is at 50%. On the right side of FIG. 7, waveform charts are shown, where the dimming level is at a lower limit.

In First Variation, only operation in case the dimming level is at maximum is different from the operation described with reference to FIG. 6. Therefore, only the operation in case the dimming level is at maximum will be described below.

The switching element 31 of the dimmer 3 is in off and the AC voltage V1 is at zero during a time period between a time t0 and a time t1, and therefore all of the light source groups 21, 22 and 23 are in off and current flows via the shunt circuit 16. During this time period, the pulsating voltage V2 is at zero and a voltage input from the resistor R101 (a voltage at a connection point between the resistors R101 and R102) is at zero, and the reference voltage V3 is accordingly set to the voltage Vref1 by the lower-limit setting circuit 144. That is, the setting circuit 14 sets the setting value Ist1 of the input current I1 to the lower limit I1b. During this time period, the consumption current by the internal circuit (e.g., the power supply circuit 34) of the dimmer 3 flows via the shunt circuit 16.

At the time t1, the switching element 31 of the dimmer 3 is turned on, and the AC voltage V1 is input into the lighting device 1. In the present embodiment, since the AC voltage V1 at the time t1 is equal to or more than the ON-voltage V21, the drive circuit 12 causes current to flow through the light source group 21, and the light source group 21 therefore emits light. In the setting circuit 14 of First Variation, when the dimming level is at maximum, the output voltage of the average value circuit 142 is more than the reference voltage V3 obtained by dividing the pulsating voltage V2. When the pulsating voltage V2 is equal to or more than the ON-voltage V21, the reference voltage V3 is less than the Zener voltage of the Zener diode ZD101, and the voltage at the connection point P1 therefore becomes equal to the reference voltage V3. Accordingly, for a time period (first time period) during which the AC voltage V1 is equal to or more than the ON-voltage V21 and less than the sum of the ON-voltages V21 and V22, the output voltage V4 of the setting circuit 14 becomes a voltage proportional to an instantaneous value of the pulsating voltage V2. Thus, the setting circuit 14 sets the setting value Ist1 of the input current I1 to a value proportional to the instantaneous value of the pulsating voltage V2, and the constant current circuit 151 controls the current I21 flowing through the light source group 21 into the value proportional to the instantaneous value of the pulsating voltage V2. As a result, since the input current I1 is controlled into the value proportional to the instantaneous value of the pulsating voltage V2, it is possible to reduce a noise (noise terminal voltage) to the AC power supply 4 or a current distortion, and increase an output of the lighting device 1.

During a time period between a time t2 and a time t3 (first time period), since the AC voltage V1 is equal to or more than the sum of the ON-voltages V21 and V22 and less than the sum of the ON-voltages V21, V22 and V23, the drive circuit 12 causes current to flow through the light source groups 21 and 22, and the light source groups 21 and 22 therefore emits light. Also during this time period, the output voltage V4 of the setting circuit 14 is increased to be proportional to the instantaneous value of the pulsating voltage V2, and the constant current circuit 152 therefore controls the input current I1 into the value proportional to the instantaneous value of the pulsating voltage V2 according to the voltage value of the output voltage V4.

During a time period between the time t3 and a time t4 (second time period), since the AC voltage V1 is equal to or more than the sum of the ON-voltages V21, V22 and V23, the drive circuit 12 causes current to flow through the light source groups 21, 22 and 23, and the light source groups 21, 22 and 23 therefore emit light. Also during this time period, the output voltage V4 of the setting circuit 14 becomes a voltage proportional to the instantaneous value of the pulsating voltage V2, and the constant current circuit 153 therefore controls the input current I1 into the value proportional to the instantaneous value of the pulsating voltage V2 according to the voltage value of the output voltage V4. Near a peak of the AC voltage V1, the reference voltage V3 obtained by the dividing circuit 141 dividing the pulsating voltage V2 exceeds the upper limit set by the limiter circuit 143, and the voltage at the connection point P1 is accordingly set to the upper limit set by the limiter circuit 143. Thus, since the output voltage V4 of the setting circuit 14 is limited to the upper limit set by the limiter circuit 143, the input current I1 is also limited to the upper limit I1a.

Then, during a time period between the time t4 and a time t5 (first time period), since the AC voltage V1 is equal to or more than the sum of the ON-voltages V21 and V22 and less than the sum of the ON-voltages V21, V22 and V23, the drive circuit 12 causes current to flow through the light source groups 21 and 22, and the light source groups 21 and 22 therefore emits light. During this time period, the output voltage V4 of the setting circuit 14 is decreased to be proportional to the instantaneous value of the pulsating voltage V2, and the constant current circuit 152 therefore controls the input current I1 into the value proportional to the instantaneous value of the pulsating voltage V2 according to the voltage value of the output voltage V4.

During a time period between the time t5 and a time t6 (first time period), since the AC voltage V1 is equal to or more than the ON-voltage V21 and less than the sum of the ON-voltages V21 and V22, the drive circuit 12 causes current to flow through the light source group 21, and the light source group 21 therefore emits light. During this time period, the output voltage V4 of the setting circuit 14 is decreased to be proportional to the instantaneous value of the pulsating voltage V2, and the constant current circuit 151 therefore controls the input current I1 into the value proportional to the instantaneous value of the pulsating voltage V2 according to the voltage value of the output voltage V4.

During a time period between the time t6 and a time t7, since the AC voltage V1 is less than the ON-voltage V21, the drive circuit 12 causes current not to flow through the light source groups 21, 22 and 23, and the light source groups 21, 22 and 23 therefore do not emit light. In this time period, the input current I1 flows via the shunt circuit 16. As the AC voltage V1 is more reduced, the setting circuit 14 more reduces the setting value Ist1 of the input current I1, and when the setting value Ist1 is reduced to the lower limit I1b, the setting circuit 14 maintains the setting value Ist1 at the lower limit I1b. When the AC voltage V1 is reduced to near zero volt, the input current I1 is limited by impedance of the shunt circuit 16, and accordingly, the input current I1 is reduced below the lower limit I1b.

The lighting device 1 repeatedly performs the operations from the time t0 to the time t7 for every half period of the AC voltage V1.

In the lighting device 1 of First Variation, in case the dimming level is at maximum, the current control circuit 13 controls the value of the input current I1 according to the instantaneous value of the AC voltage V1 (pulsating voltage V2) so that the input current I1 proportional to the instantaneous value of the AC voltage V1 is made to flow. The lighting device 1 of First Variation therefore can more reduce a distortion of input current and realize higher output, compared with a case where the input current I1 has a trapezoidal current waveform, as shown in FIG. 6.

(3.2) Second Variation of First Embodiment

A lighting device 1 of Second Variation of First Embodiment will be described below with reference to FIG. 8.

The lighting device 1 of Second Variation is similar to the lighting device 1 of First Variation other than that types of solid light sources 2 of the light source groups 21, 22 and 23 are different from those of the lighting device 1 of First Variation. Specifically, in the lighting device 1 of Second Variation, the light source group 21 emitting light during at least the first time period is defined as a first light source group, and the light source group 23 emitting light during only the second time period is defined as a second light source group, and solid light sources 2 grouped into the first light source group (light source group 21) emit light of a color temperature lower than a color temperature of light emitted by solid light sources 2 grouped into the second light source group (light source group 23). In other words, solid light sources 2 grouped into the first light source group (light source group 21) emit light of a first color temperature, and solid light sources 2 grouped into the second light source group (light source group 23) emit light of a second color temperature, and the first color temperature is lower than the second color temperature. In the present embodiment, solid light sources 2 grouped into the first light source group (light source group 21) emit light of a color temperature lower than a color temperature of light emitted by solid light sources 2 grouped into the light source group 22, and further lower than a color temperature of light emitted by solid light sources 2 grouped into the light source groups 22 and 23.

A current control circuit 13 of the lighting device 1 of Second Variation changes the input current I1 so as to be proportional to the instantaneous value of the AC voltage V1 when the dimming level is at maximum, similarly to the case of First Variation.

On the other hand, in case of dimming the light source groups 21, 22 and 23, the current control circuit 13 of the lighting device 1 of Second Variation sets the setting value of the input current I1 regardless of the average voltage of the pulsating voltage V2 during a time period of causing current to flow through only the first light source group (a time period in the second mode). Also, the current control circuit 13 sets the setting value of the input current I1 so as to be proportional to the average voltage of the pulsating voltage V2 during a time period of causing current to flow through the first and second light source groups (time periods in the third mode and the fourth mode).

Figure 8:
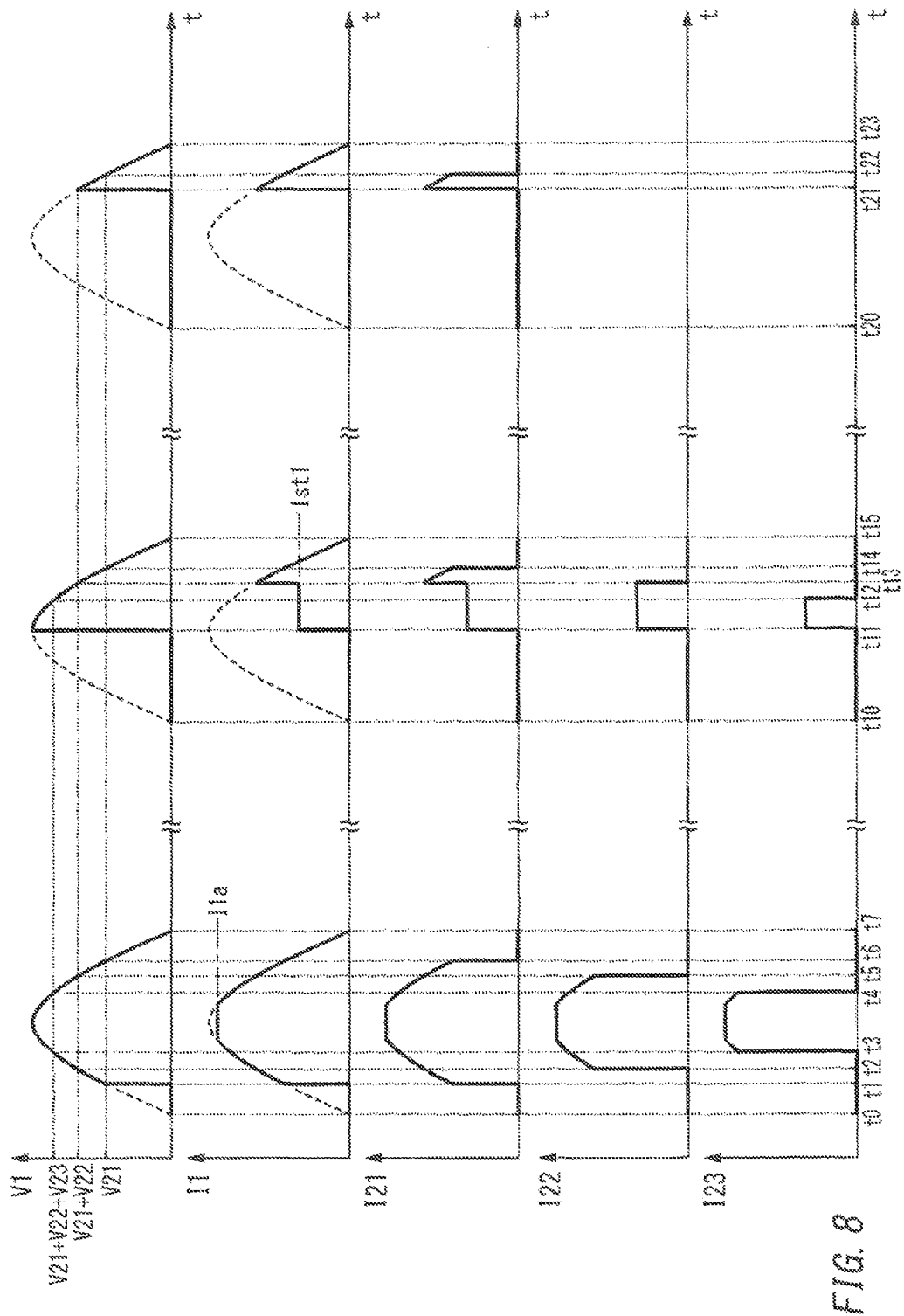
FIG. 8 is a waveform chart for explaining operation of a Second Variation in the lighting device of the First Embodiment.

FIG. 8 is a waveform chart for explaining the operation of the lighting device 1 of Second Variation. FIG. 8 illustrates waveform charts of the AC voltage V1, the input current I1, the current I21, the current I22 and the current I23 in this order from above of FIG. 8. On the left side of FIG. 8, waveform charts are shown, where the dimming level is at maximum (100%). On the center of FIG. 8, waveform charts are shown, where the dimming level is at 50%. On the right side of FIG. 8, waveform charts are shown, where the dimming level is at a lower limit.

Since the lighting device 1 of Second Variation controls the value of the input current I1 into a value proportional to the average voltage of the pulsating voltage V2 in the third mode and the fourth mode where the voltage value of the AC voltage V1 is near a peak, the value of the input current I1 can be more reduced as the dimming level is more reduced. That is, as the dimming level is more reduced, the lighting device 1 controls so as to more reduce currents I22 and I23 flowing through solid light sources 2 grouped into the light source groups 22 and 23.

Furthermore, since the lighting device 1 of Second Variation controls the value of the input current I1 into a value proportional to the instantaneous value of the AC voltage V1 in the first mode and the second mode, the value of the current is controlled into the same value regardless of the dimming level. That is, the lighting device 1 controls current I21 flowing through solid light sources 2 grouped into the light source group 21 into the same value regardless of the dimming level.

Thus, as the dimming level is more reduced, a difference between current through the light source groups 22 and 23 and current through the light source group 21 is more increased. That is, as the dimming level is more reduced, a ratio of current through the first light source group (light source group 21) emitting light of a low color temperature is increased with respect to current through the second light source group (light source group 23) emitting light of a high color temperature. Therefore as the dimming level is more reduced, a ratio of the quantity in light of the low color temperature, emitted by the first light source group, is more increased with respect to the whole quantity in light emitted by all groups. It is accordingly possible to control a color temperature of light emission color so as to be more reduced.

(3.3) Other Variations of First Embodiment

In the present embodiment, each of the light source groups 21, 22 and 23 includes two or more solid light sources 2, but may instead include a single solid light source 2.

In the present embodiment, the two or more solid light sources 2 are grouped into the three light source groups 21, 22 and 23 (that is, each of the two or more solid light sources 2 belongs to any one of the three light source groups 21, 22 and 23), but the number of the light source groups may be two, four or more. When the number of the light source groups is four or more, it is possible to use a capacitor with a smaller electrostatic capacity, as the capacitor connected in parallel to each light source group, and therefore the lighting device 1 can further reduce a circuit loss.

In the present embodiment, each solid light source 2 is an SMD type of light-emitting diode, but may be a COB (Chip On Board) type of light-emitting diode. Each solid light source 2 is a light-emitting diode, but is not limited to it. Each solid light source 2 may be a semiconductor laser, an organic electroluminescence element or the like.

In the present embodiment, the average value circuit 142 detects the average value of the AC voltage V1 from the pulsating voltage V2 after the rectifier circuit 11 performs full-wave rectification for the AC voltage V1, but may detect the average value of the AC voltage V1 at any detection point where a voltage proportional to the average value of the AC voltage V1 is generated.

Second Embodiment

Hereinafter, a luminaire of the present embodiment will be described in detail.

Figure 9A:
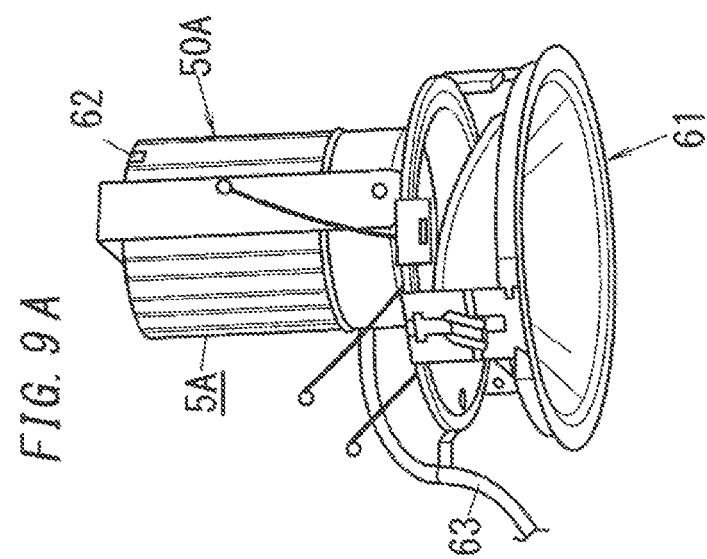
FIG. 9A is a perspective view of a luminaire of a Second Embodiment.

FIG. 9A is a perspective view of a luminaire 5A of the present embodiment.

This luminaire 5A includes the lighting device 1 described in First Embodiment and a main body 50A for housing the lighting device 1.

The luminaire 5A is configured as a downlight that is to be embedded and arranged in a ceiling. The luminaire 5A includes: the main body 50A for housing the light source groups 21, 22 and 23 and the lighting device 1; and a reflector 61. The main body 50A is provided on the top thereof with heat radiation fins 62. From the main body 50A, a power supply cable 63 is led out. The power supply cable 63 connects the lighting device 1 housed in the main body 50A with the AC power supply 4.

(Variations of Second Embodiment)

The luminaire including the lighting device 1 described in First Embodiment is not limited to the configuration as the downlight, but may be configured as a spotlight or the other aspect.

Figure 9B:
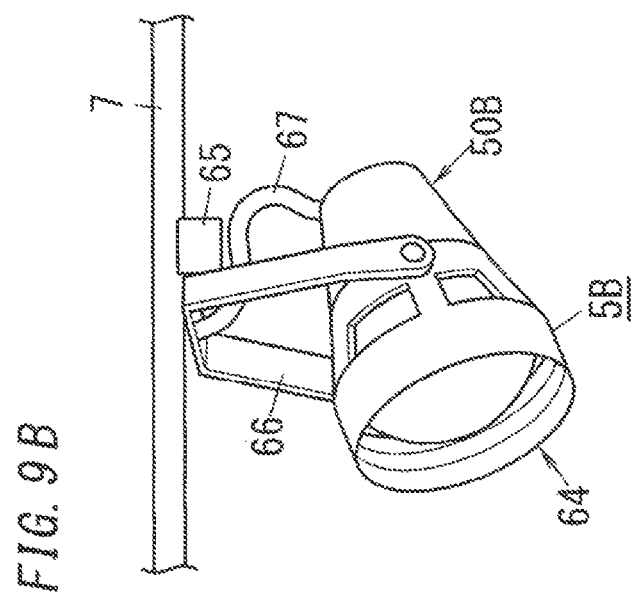
FIG. 9B is a perspective view of a First Variation in the luminaire of the Second Embodiment.
Figure 9C:
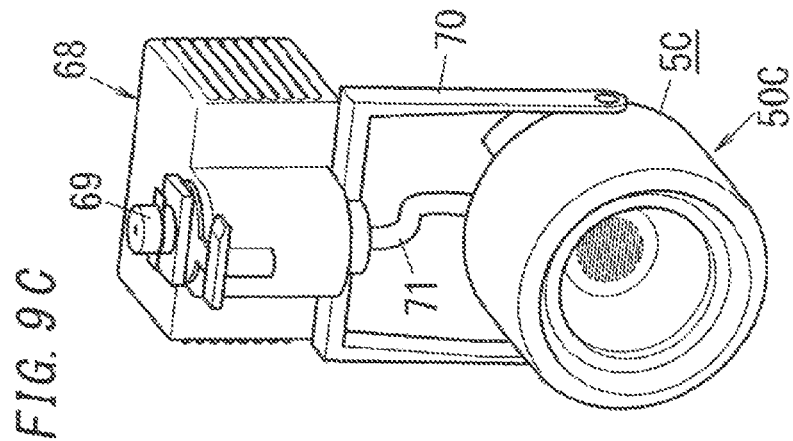
FIG. 9C is a perspective view of a Second Variation in the luminaire of the Second Embodiment.

FIGS. 9B and 9C respectively illustrate luminaires 5B (First Variation) and 5C (Second Variation) each configured as a spotlight that is to be attached to a wiring duct 7.

As shown in FIG. 9B, the luminaire 5B of First Variation includes a main body 50B, a reflector 64, a connector 65 and an arm 66. The main body 50B houses therein the light source groups 21, 22 and 23 and the lighting device 1. The connector 65 is attached to the wiring duct 7. The arm 66 couples the connector 65 with the main body 50B. The lighting device 1 housed in the main body 50B is connected to the connector 65 with a power supply cable 67.

As shown in FIG. 9C, the luminaire 5C of Second Variation includes a main body 50C, a box 68, a coupling part 70 and a power supply cable 71. The main body 50C houses therein the light source groups 21, 22 and 23. The box 68 houses therein the lighting device 1. The coupling part 70 couples the main body 50C with the box 68. The power supply cable 71 connects the light source groups 21, 22 and 23 housed in the main body 50C with the lighting device 1 housed in the box 68. The box 68 is provided on the top thereof with a connector 69 that is to be detachably, electrically and mechanically attached to the wiring duct 7.

The configuration (including First Variation and Second Variation) described in Second Embodiment may be appropriately applied in combination with the configuration (including Variations) described in First Embodiment.

As apparent from the above-mentioned embodiments, a lighting device (1) of a first aspect includes a rectifier circuit (11), a drive circuit (12) and a current control circuit (13). The rectifier circuit (11) has a pair of output terminals (113, 114) that are to be connected to a load circuit (20) including two or more solid light sources (2). The two or more solid light sources (2) are connected in series. The rectifier circuit (11) is configured to rectify an AC voltage (V1) so as to generate a pulsating voltage (V2) between the output terminals (113, 114). The drive circuit (12) is configured to change a number of the two or more solid light sources (2) which emit light, according to a change in a voltage value of the pulsating voltage (V2), so that a period of the pulsating voltage (V2) includes a first time period and a second time period. The first time period is a time period during which a part of the two or more solid light sources (2) emits light and other of the two or more solid light sources (2) do not emit light. The second time period is a time period during which all of the two or more solid light sources (2) emit light. The current control circuit (13) is configured to control, in at least the second time period, a value of current (I1) flowing through the load circuit (20) according to an average voltage of the pulsating voltage (V2).

According to the lighting device (1) of the first aspect, since the current control circuit (13) controls a value of a load current (I1) flowing through the load circuit (20) according to an average voltage of the pulsating voltage (V2), the value of the load current (I1) can be suppressed from changing, and a ripple in light output can be therefore suppressed. Thus, capacitors (C1, C2 and C3) connected in parallel to light source groups (21, 22 and 23) are not needed to have relatively-large electrostatic capacities to suppress the ripple in the light output, and an increase in a circuit loss can be therefore suppressed.

For example in case the dimming level is at 50%, a peak value of the current (I1) through the load circuit (20) is reduced to a half of a conventional value. Accordingly, a ripple in the current (I1) is also reduced to a half of a conventional one, and the ripple in the light output can be suppressed.

Furthermore, the lighting device (1) of the above-mentioned embodiment can change the light output of the two or more solid light sources (2) so as to be proportional to a square of a conduction angle of the AC voltage (V1), rather than so as to be proportional to the conduction angle. That is, since the lighting device (1) can change the light output of the two or more solid light sources (2) so as to be proportional to a square of an operation amount for an operation part of a dimmer (3), rather than so as to be proportional to the operation amount, a natural dimming without feeling of incompatibility can be provided.

Regarding a lighting device (1) of a second aspect, in the first aspect, the drive circuit (12) is configured to increase the number of the solid light sources (2) emitting light, according to an increase in the voltage value of the pulsating voltage (V2), and decrease the number of the solid light sources (2) emitting light, according to a decrease in the voltage value of the pulsating voltage (V2).

According to the second aspect, since the lighting device (1) applies the pulsating voltage (V2) obtained by rectifying the AC voltage (V1) to the load circuit (20) to cause the solid light sources (2) to emit light, a circuit for converting the AC voltage (V1) to a DC voltage is not needed.

Regarding a lighting device (1) of a third aspect, in the first aspect or the second aspect, the two or more solid light sources (2) are grouped into two or more light source groups (21, 22, 23). The drive circuit (12) is configured to change a number of the two or more light source groups (21, 22, 23) which emit light, according to the change in the voltage value of the pulsating voltage (V2), so as to change the number of the solid light sources (2) emitting light.

According to the third aspect, since the drive circuit (12) increases or decreases the number of light source groups (21, 22, 23) emitting light, according to the change in the voltage value of the pulsating voltage (V2), the number of solid light sources (2) emitting light can be changed.

Regarding a lighting device (1) of a fourth aspect, in the third aspect, the drive circuit (12) includes two or more rectifying elements (D1, D2, D3) that respectively correspond to the two or more light source groups (21, 22, 23). Each of the two or more rectifying elements (D1, D2, D3) is connected between a low-potential side end of a corresponding light source group of the two or more light source groups (21, 22, 23) and a low-potential side output terminal (114) of the output terminals (113, 114). The drive circuit (12) is configured to change, when any of the two or more rectifying elements (D1, D2, D3) is forward-biased according to the change in the voltage value of the pulsating voltage (V2), the number of light source groups (21, 22, 23) emitting light.

According to the fourth aspect, since the number of light source groups (21, 22, 23) emitting light is changed when any of the two or more rectifying elements (D1, D2, D3) is forward-biased according to the change in the voltage value of the pulsating voltage (V2), a control circuit and the like are not needed.

Regarding a lighting device (1) of a fifth aspect, in the fourth aspect, the current control circuit (13) includes two or more constant current circuits (151, 152, 153) that respectively correspond to the two or more rectifying elements (D1, D2, D3). Each of the two or more constant current circuits (151, 152, 153) is connected between a corresponding rectifying element of the two or more rectifying elements (D1, D2, D3) and the low-potential side output terminal (114) of the output terminals (113, 114). Each of the two or more constant current circuits (151, 152, 153) is configured to control the value of the current (I1) flowing through the load circuit (20) according to the average voltage of the pulsating voltage (V2).

According to the fifth aspect, the constant current circuits (151, 152, 153) can control the value of the current (I1) flowing through one or more light source groups emitting light, of the two or more light source groups (21, 22, 23).

A lighting device (1) of a sixth aspect, in any one of the third to the fifth aspects, further includes two or more capacitors (C1, C2, C3) that are respectively connected in parallel to the two or more light source groups (21, 22, 23).

According to the sixth aspect, the capacitors (C1, C2, C3) respectively connected in parallel to the two or more light source groups (21, 22, 23) can further reduce the ripple in the light output.

Regarding a lighting device (1) of a seventh aspect, in any one of the third to the sixth aspects, the two or more light source groups (21, 22, 23) include a first light source group (21) and a second light source group (23). The first light source group (21) emits light during at least the first time period. The second light source group (23) emits light during only the second time period. A solid light source (2) grouped into the first light source group (21), of the two or more solid light sources (2), emits light of a first color temperature. A solid light source (2) grouped into the second light source group (23), of the two or more solid light sources (2), emits light of a second color temperature. The first color temperature is lower than the second color temperature.

According to the seventh aspect, in case the current (I1) through the load circuit (20) for the second time period is suppressed, when the dimming level is reduced, a difference between the current (I1) through the load circuit (20) for the first time period and the current (I1) through the load circuit (20) for the second time period is reduced. A ratio of quantity in light emitted by the first light source group (21) is therefore increased with respect to the whole quantity in light emitted by all groups. The lighting device (1) accordingly can control a color temperature of light emission color so as to be more reduced.

A lighting device (1) of an eighth aspect, in any one of the first to the seventh aspects, further includes a shunt circuit (16). The shunt circuit (16) includes a resistor (R10) and a switch (Q10), the resistor (R10) and the switch (Q10) being connected in series. The shunt circuit (16) is connected between the output terminals (113, 114). The switch (Q10) is in ON for a time period during which the current (I1) does not flow through the load circuit (20).

According to the eighth aspect, in case the AC power supply (4) and the dimmer (3) are directly connected between the input terminals of the rectifier circuit (11), when the switch (Q10) of the shunt circuit (16) is in ON for the time period during which the current (I1) does not flow through the load circuit (20), current flows through the dimmer (3), and accordingly, the dimmer (3) can obtain power to be required for operation.

Regarding a lighting device (1) of a ninth aspect, in any one of the first to the eighth aspects, the current control circuit (13) includes a limiter circuit (143). The limiter circuit (143) is configured to limit, when the average voltage of the pulsating voltage (V2) is equal to or more than a threshold, the value of the current (I1) flowing through the load circuit (20) to a prescribed value.

According to the ninth aspect, since the lighting device (1) includes the limiter circuit (143), the value of the current (I1) flowing through the load circuit (20) can be limited to the prescribed value.

A luminaire (5A, 5B, 5C) of a tenth aspect includes the lighting device (1) of any one of the first to the ninth aspects and a main body (50A, 50B, 50C) for holding the lighting device (1).

According to the tenth aspect, since the luminaire (5A, 5B, 5C) includes the lighting device (1) of any one of the first to the ninth aspects, it is possible to more reduce the ripple in the light output, compared with the conventional example described in the Patent literature 1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
a rectifier circuit having a pair of output terminals that are to be connected to a load circuit including two or more solid light sources, the two or more solid light sources being connected in series, the rectifier circuit being configured to rectify an AC voltage so as to generate a pulsating voltage between the output terminals;
a drive circuit configured to change a number of the two or more solid light sources which emit light, according to a change in a voltage value of the pulsating voltage, so that a period of the pulsating voltage includes
a first time period during which a part of the two or more solid light sources emits light and other of the two or more solid light sources do not emit light, and
a second time period during which all of the two or more solid light sources emit light; and
a current control circuit including two or more constant current circuits that respectively correspond to the two or more solid light sources and a setting circuit operably connected to the two or more constant current circuits and configured to set a reference voltage input to the two or more constant current circuits to control, in at least the second time period, a value of current flowing through the load circuit according to an average voltage of the pulsating voltage.

2. The lighting device according to claim 1, wherein the drive circuit is configured to increase the number of the solid light sources emitting light, according to an increase in the voltage value of the pulsating voltage, and decrease the number of the solid light sources emitting light, according to a decrease in the voltage value of the pulsating voltage.

3. The lighting device according to claim 2, wherein:
the two or more solid light sources are grouped into two or more light source groups; and
the drive circuit is configured to change a number of the two or more light source groups which emit light, according to the change in the voltage value of the pulsating voltage, so as to change the number of the solid light sources emitting light.

4. The lighting device according to claim 3, wherein:
the drive circuit comprises two or more rectifying elements that respectively correspond to the two or more light source groups;
each of the two or more rectifying elements is connected between a low-potential side end of a corresponding light source group of the two or more light source groups and a low-potential side output terminal of the output terminals; and
the drive circuit is configured to change, when any of the two or more rectifying elements is forward-biased according to the change in the voltage value of the pulsating voltage, the number of light source groups emitting light.

5. The lighting device according to claim 4, wherein:
the two or more constant current circuits respectively correspond to the two or more rectifying elements; and
each of the two or more constant current circuits is connected between a corresponding rectifying element of the two or more rectifying elements and the low-potential side output terminal of the output terminals.

6. The lighting device according to claim 2, further comprising a shunt circuit including a resistor and a switch, the resistor and the switch being connected in series, wherein:
the shunt circuit is connected between the output terminals; and
the switch is in ON for a time period during which the current does not flow through the load circuit.

7. The lighting device according to claim 2, wherein:
the current control circuit comprises a limiter circuit; and
the limiter circuit is configured to limit, when the average voltage of the pulsating voltage is equal to or more than a threshold, the value of the current flowing through the load circuit to a prescribed value.

8. The lighting device according to claim 3, further comprising two or more capacitors that are respectively connected in parallel to the two or more light source groups.

9. The lighting device according to claim 3, wherein:
the two or more light source groups include
a first light source group emitting light during at least the first time period, and
a second light source group emitting light during only the second time period;
a solid light source grouped into the first light source group, of the two or more solid light sources, emits light of a first color temperature;
a solid light source grouped into the second light source group, of the two or more solid light sources, emits light of a second color temperature; and
the first color temperature is lower than the second color temperature.

10. The lighting device according to claim 3, further comprising a shunt circuit including a resistor and a switch, the resistor and the switch being connected in series, wherein:
the shunt circuit is connected between the output terminals; and
the switch is in ON for a time period during which the current does not flow through the load circuit.

11. The lighting device according to claim 1, wherein:
the two or more solid light sources are grouped into two or more light source groups; and
the drive circuit is configured to change a number of the two or more light source groups which emit light, according to the change in the voltage value of the pulsating voltage, so as to change the number of the solid light sources emitting light.

12. The lighting device according to claim 11, wherein:
the drive circuit comprises two or more rectifying elements that respectively correspond to the two or more light source groups;
each of the two or more rectifying elements is connected between a low-potential side end of a corresponding light source group of the two or more light source groups and a low-potential side output terminal of the output terminals; and
the drive circuit is configured to change, when any of the two or more rectifying elements is forward-biased according to the change in the voltage value of the pulsating voltage, the number of light source groups emitting light.

13. The lighting device according to claim 12, wherein:
the two or more constant current circuits respectively correspond to the two or more rectifying elements; and
each of the two or more constant current circuits is connected between a corresponding rectifying element of the two or more rectifying elements and the low-potential side output terminal of the output terminals.

14. The lighting device according to claim 11, further comprising two or more capacitors that are respectively connected in parallel to the two or more light source groups.

15. The lighting device according to claim 11, wherein:
the two or more light source groups include
a first light source group emitting light during at least the first time period, and
a second light source group emitting light during only the second time period;
a solid light source grouped into the first light source group, of the two or more solid light sources, emits light of a first color temperature;
a solid light source grouped into the second light source group, of the two or more solid light sources, emits light of a second color temperature; and
the first color temperature is lower than the second color temperature.

16. The lighting device according to claim 11, further comprising a shunt circuit including a resistor and a switch, the resistor and the switch being connected in series, wherein:

the shunt circuit is connected between the output terminals; and the switch is in ON for a time period during which the current does not flow through the load circuit.

17. The lighting device according to claim 11, wherein:

the current control circuit comprises a limiter circuit; and the limiter circuit is configured to limit, when the average voltage of the pulsating voltage is equal to or more than a threshold, the value of the current flowing through the load circuit to a prescribed value.

18. The lighting device according to claim 1, further comprising a shunt circuit including a resistor and a switch, the resistor and the switch being connected in series, wherein:

the shunt circuit is connected between the output terminals; and the switch is in ON for a time period during which the current does not flow through the load circuit.

19. The lighting device according to claim 1, wherein:

the current control circuit comprises a limiter circuit; and the limiter circuit is configured to limit, when the average voltage of the pulsating voltage is equal to or more than a threshold, the value of the current flowing through the load circuit to a prescribed value.

20. A luminaire, comprising:

the lighting device according to claim 1; and a main body for holding the lighting device.

* * * * *